United States Patent
Pardes et al.

(10) Patent No.: US 8,087,553 B2
(45) Date of Patent: *Jan. 3, 2012

(54) ONE WAY VALVE ASSEMBLY

(75) Inventors: Greg Pardes, New York, NY (US);
Stewart Swiss, Lloyd Harbor, NY (US)

(73) Assignee: ReSeal International Limited Partnership, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/417,101

(22) Filed: Apr. 2, 2009

(65) Prior Publication Data
US 2009/0250492 A1    Oct. 8, 2009

Related U.S. Application Data

(63) Continuation of application No. 11/949,154, filed on Dec. 3, 2007, now Pat. No. 7,513,396, which is a continuation of application No. 11/267,868, filed on Nov. 3, 2005, now Pat. No. 7,306,129.

(51) Int. Cl.
*B65D 5/72* (2006.01)

(52) U.S. Cl. ........ 222/494; 222/105; 222/212; 222/213; 222/326; 222/490; 137/853; 604/213

(58) Field of Classification Search .......... 222/490–491, 222/494–497, 420–422, 206–207, 212–215, 222/105, 107, 630–631, 183, 326, 386, 94–95, 222/325, 327; 137/852–853; 604/298, 213
See application file for complete search history.

(56) References Cited

U.S. PATENT DOCUMENTS

| | | | | |
|---|---|---|---|---|
| 3,766,816 A * | 10/1973 | Loveless | .......................... | 83/489 |
| 4,702,398 A * | 10/1987 | Seager | .......................... | 222/386 |
| 4,846,810 A * | 7/1989 | Gerber | .......................... | 604/247 |
| 5,080,138 A * | 1/1992 | Haviv | .......................... | 137/853 |
| 5,092,855 A * | 3/1992 | Pardes | .......................... | 604/247 |
| 5,190,190 A * | 3/1993 | Fudalla | .......................... | 222/105 |
| 5,305,786 A * | 4/1994 | Debush | .......................... | 137/512.3 |
| 5,836,484 A * | 11/1998 | Gerber | .......................... | 222/494 |
| 6,325,253 B1 * | 12/2001 | Robinson | .......................... | 222/212 |
| 6,386,395 B1 * | 5/2002 | Lunghetti | .......................... | 222/213 |
| 6,536,631 B1 * | 3/2003 | Nickels et al. | .......................... | 222/212 |
| 6,662,977 B2 * | 12/2003 | Gerber et al. | .......................... | 222/494 |
| 6,695,173 B1 * | 2/2004 | Fontana | .......................... | 222/212 |
| 6,896,151 B1 * | 5/2005 | Robinson | .......................... | 222/1 |
| 7,306,129 B2 * | 12/2007 | Swiss et al. | .......................... | 222/494 |
| 7,513,396 B2 * | 4/2009 | Pardes et al. | .......................... | 222/494 |

* cited by examiner

*Primary Examiner* — Frederick C. Nicolas
(74) *Attorney, Agent, or Firm* — Aaron Haleva; Kramer Levin Naftalis & Frankel LLP

(57) ABSTRACT

A one way valve assembly flows a sterile flowable substance from a source to an outlet orifice and prevents any backflow of contaminants through the one way valve assembly when the flowable substance ceases to flow. The valve assembly includes an elastomeric membrane which aids in preventing any backflow of contaminants when dispensing of the flowable substance is stopped.

17 Claims, 5 Drawing Sheets

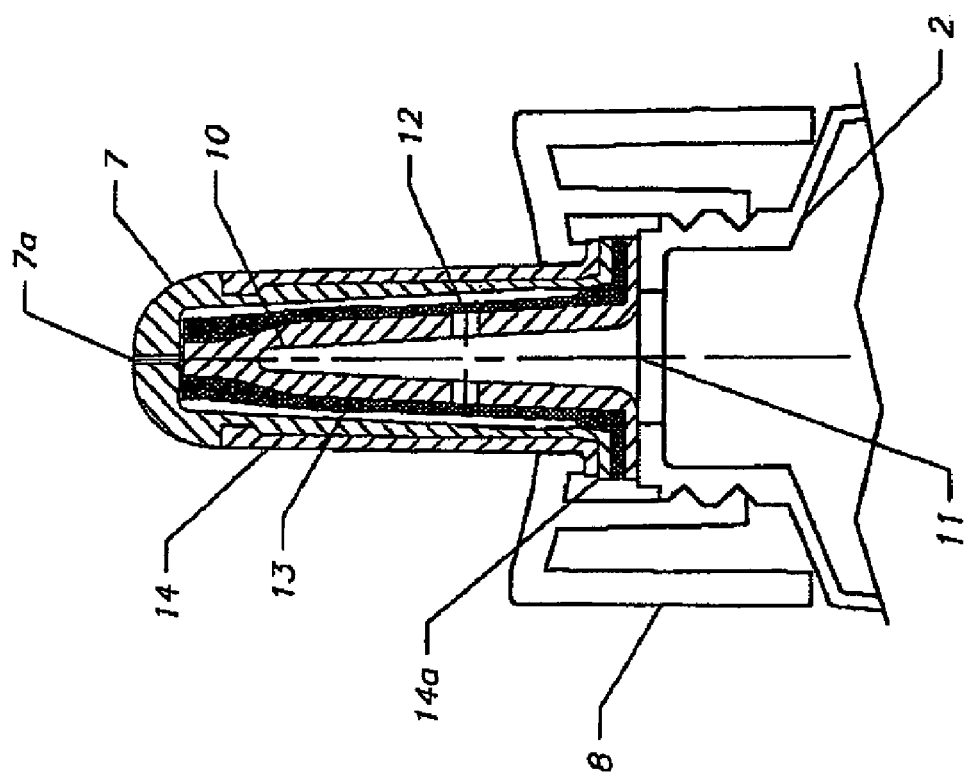
Figure 3A — Reservoir At Rest

ONE WAY VALVE ASSEMBLY

RELATED APPLICATIONS

This application is a continuation of U.S. Ser. No. 11/949,154, filed Dec. 3, 2007, now pending which is a continuation of U.S. Ser. No. 11/267,868, filed Nov. 3, 2005, now U.S. Pat. No. 7,306,129, the contents of each of which are hereby incorporated by reference in their entirety.

BACKGROUND OF THE INVENTION

The present invention is directed to a one way valve assembly for dispensing a sterile flowable substance while preventing any backflow of contaminants into the source of the flowable substance. The valve assembly includes a valve body enclosed by a pressure displaceable flexible member or elastomeric member for effecting the passage of the flowable substance to a controllable outlet while preventing any backflow to the source of the flowable substance after dispensing individual portions of the flowable substance.

In the past, to maintain the flowable substance free of contaminants, preservatives have been mixed in the flowable substance in the container from which it is to be dispensed. The use of preservatives is an added expense and tends to limit the effectiveness of the flowable substance, particularly when the flowable substance is a pharmaceutical such as an eye care solution or it is a food stuff.

Another consideration is the ability of the valve assembly to deliver a selected amount to the outlet without causing any damage to the user, such as when applying an eye care solution directly into the eye.

In recent years, flexible membranes have been used to control the flow of the flowable substance to the valve assembly outlet while preventing any backflow to the source of the flowable substance, however, it has been difficult to provide an effective procedure for manufacturing the valve assembly and limiting its costs.

SUMMARY OF THE INVENTION

Therefore, the primary object of the present invention is to provide a valve assembly for conveying a flowable substance from a closed source, such as a collapsible container while preventing any backflow of contaminants through the valve assembly into the source of the flowable substance after a portion of the substance has been dispensed.

The collapsible container can be a bellows type, a tube, an internal bag or other type of collapsible form designed to dispense practically all of its contents. The container has a normally closed controllable outlet surface for dispensing a flow of the flowable substance out of the valve assembly. The container is in sealed contact with the valve assembly so that its contents do not receive any contaminants when the flowable substance is dispensed.

Dispensation of the flowable substance is effected by applying pressure to the container so that its contents flow to the valve assembly. The contents may be a pharmaceutical, such as an eye care solution or other substance which must be kept free of contaminants during dispensing a multiple number of dispensed amounts. Other flowable substances can be food stuffs or beverages, cosmetics, or other flowable substances intended to be maintained free of contaminants during the dispensing operation. The container may be protected by a housing so that pressure is not accidentally applied.

The valve assembly is an axially extending structure open to the container of the flowable substance. The valve assembly is formed of an axially extending inner core open to the container and formed of a rigid plastic component. The interior of the core has a passageway for receiving the flowable substance from the container. At least one port extending from the passageway affords an opening for conveying the flowable substance out of the inner core.

Tightly enclosing the inner core is an axially extending flexible membrane covering the outlet end of the port through the inner core. The flexible membrane moves outwardly from the inner core when the flowable substance is pressurized and passes through the port and flows toward the outlet end of flexible membrane.

Laterally outwardly from the flexible membrane is a valve cover ending in the controllable outlet orifice. The pressurized flowable substance travels between the radially outwardly extended flexible membrane and the outer surface of the inner core and flows to the controllable outlet orifice. The outlet orifice can provide for a limited amount of the flowable substance to be dispensed.

An over cap covers the exterior of the valve cover to protect the valve assembly during storage, and to avoid accidental dispensing.

A collar joins the valve assembly to the container and affords a sealed arrangement preventing any flow of contaminants into the container.

The various features of novelty which characterize the invention are pointed out with particularity in the claims annexed to and forming a part of this disclosure. For a better understanding of the invention, its operation, advantages and specific objects attained by its use, reference should be had to the accompanying drawings and descriptive matter in which there are illustrated and described a preferred embodiment of the invention.

BRIEF DESCRIPTION OF THE DRAWINGS

FIG. 3a is an enlarged axially extending partial view of the one way valve assembly in the at rest position;

DETAILED DESCRIPTION OF THE INVENTION

Figure 1:
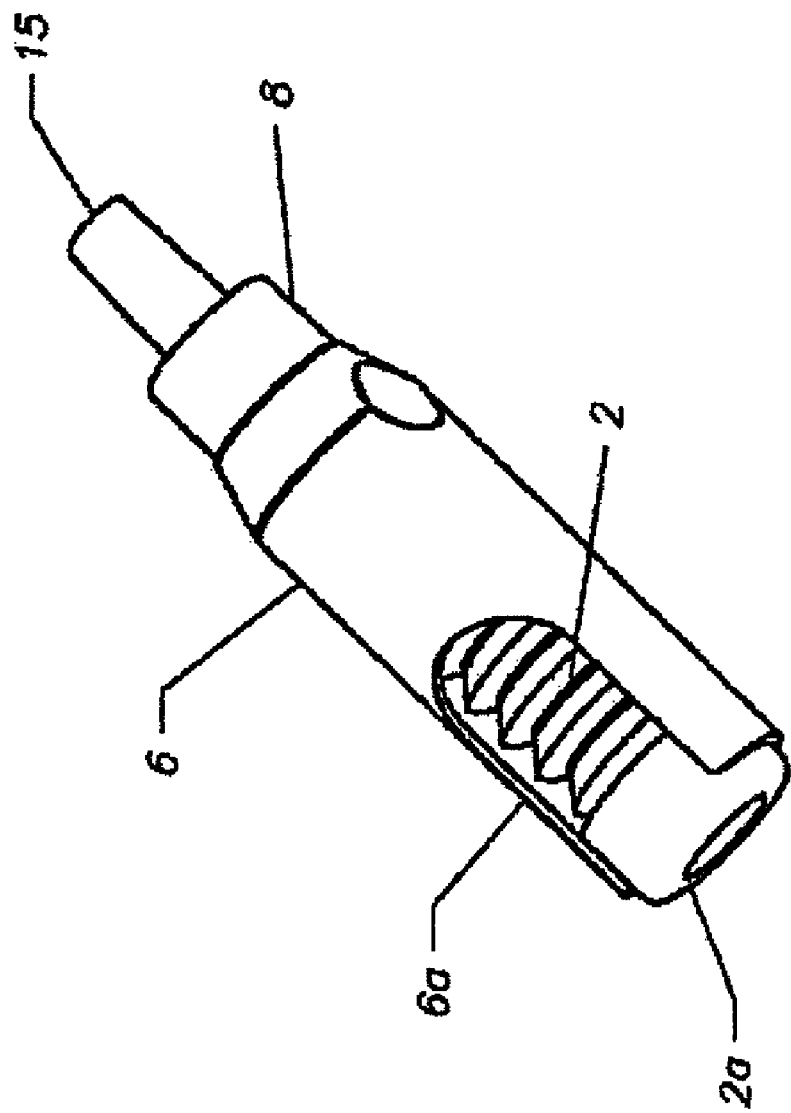
FIG. 1 is an axially extending view of a one way valve assembly embodying the present invention.

As shown in FIG. 1 the one way valve assembly 1 is composed of a bellows container or source 2 holding a sterile flowable substance, a valve assembly 3 for conveying the flowable substance from the container 2 to an outlet when pressure is applied to the container 2 and an over cap 15 covering the valve assembly 3 to prevent contamination from entering the valve assembly 3 during storage.

The bellows container 2 collapses when pressure is applied to the container, however, other containers may be used such as a tube or an internal bag in a container which permit multi-dose dispensation of the flowable substance without contamination entering the container following the dispensing procedure.

The flowable substance may be a pharmaceutical, such as a eye care solution, a food stuff, such as products or juices, and a cosmetic, such as a skin care solution or toiletries, and liquid vitamins, all of which are intended to be maintained free of contaminants from the ambient atmosphere.

The bellows container or source 2 is laterally enclosed by an axially extending housing 6 to provide better ergonomic control during dispensing. A slot 6a extending axially in the housing 6 permits a user to gain access to an actuator 2a of the container as the flowable substance is pressed out.

A collar 8 connects the valve body 3 to the container 2 affording a scaled connection so that ambient contaminants cannot pass into the container 2.

The valve assembly 3 has an axially extending inner core 10 bearing against the opening of the container 2 so that flow from the container enters into an axially extending blind passageway 11 in the inner core. The passageway 11 extends for a major portion of the axial length of the inner core. At approximately half the length of the passageway 11 the inner core has at least one port 12 extending transversely of the passageway axis from the surface of the passageway to the outer surface of the inner core 10. The inner core 10 is formed of a rigid plastic material and terminates inwardly of the outlet end of the valve body.

A flexible membrane 13, such as an elastomeric member, is fitted tightly over the outer surface of the inner core and extends from the opening in the container 2 to the opposite end of the inner core 10. As can be noted in FIGS. 2a and 2b, the thickness of the membrane is variable along its axial length and in the region of the outlet end of the inner core has an axially extending continuous uninterrupted annular band considerably thicker than the remainder of the flexible membrane 13, that is, the band is not separated in the axial direction by axially extending cuts.

At its end adjacent the opening from the container, the flexible membrane 13 has an outwardly extending flange bearing against a flange on the inner core is located at the opening from the container.

Figure 2:
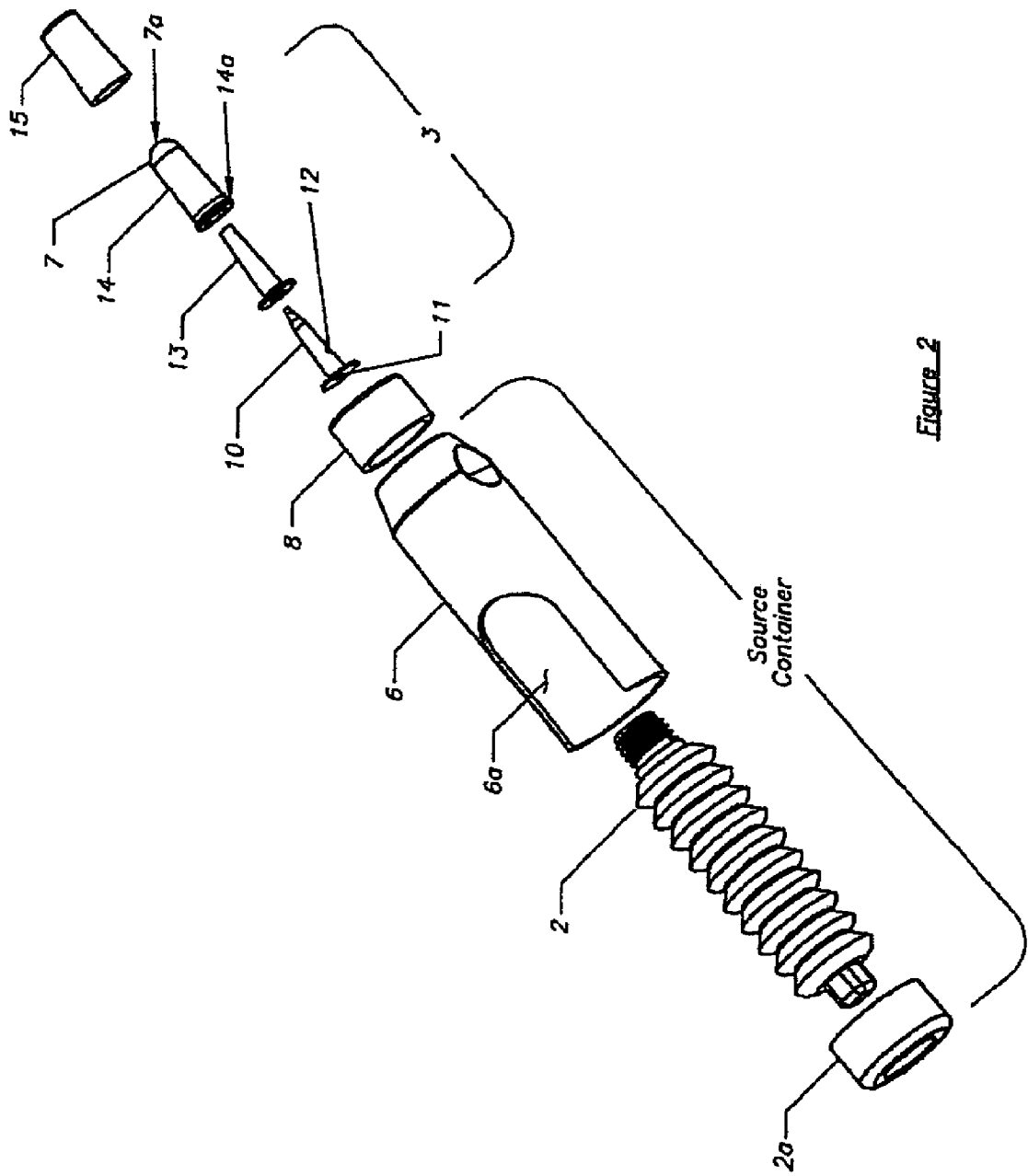
FIG. 2 is an exploded view of the one way valve assembly shown in FIG. 1.
Figure 3B:
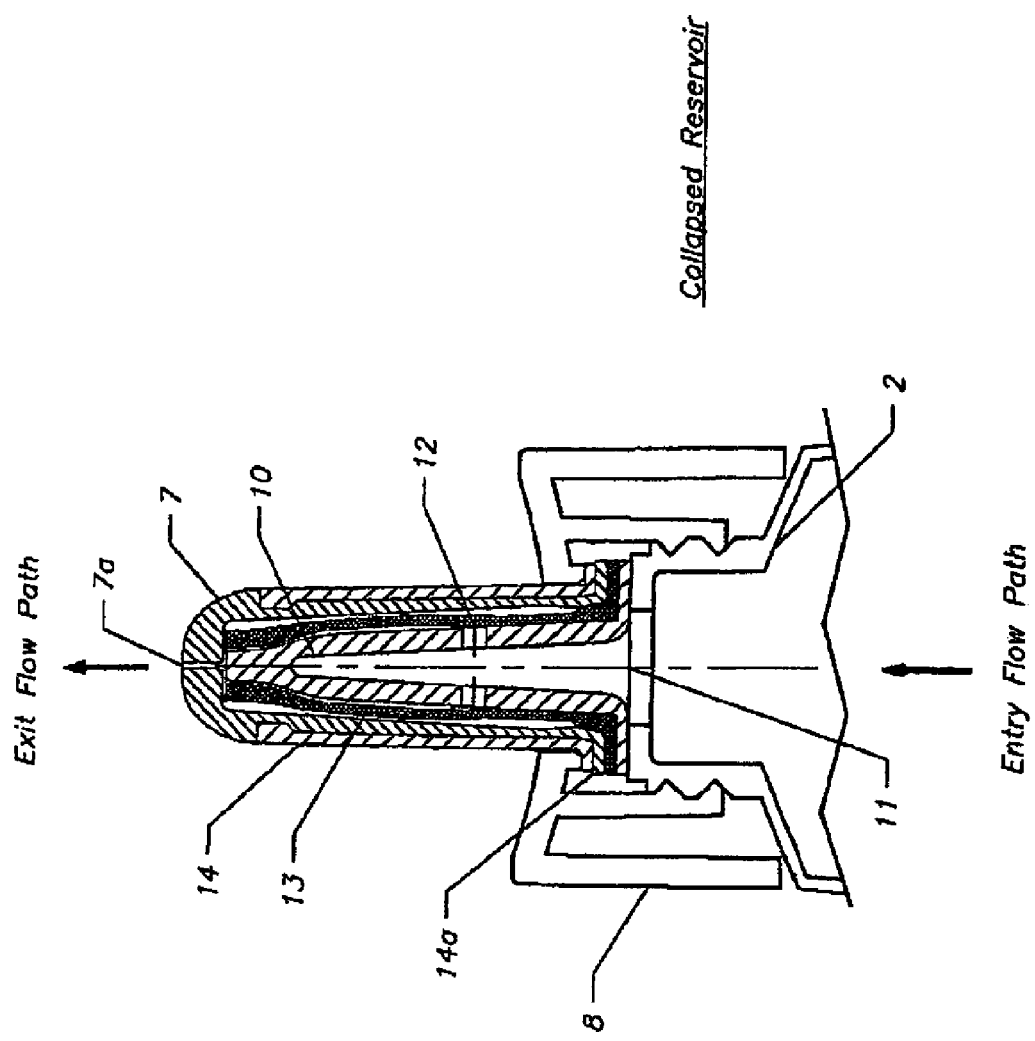
FIG. 3b is a partial view similar to FIG. 3a, however, with the one way valve assembly in the dispensing position.
Figure 4:
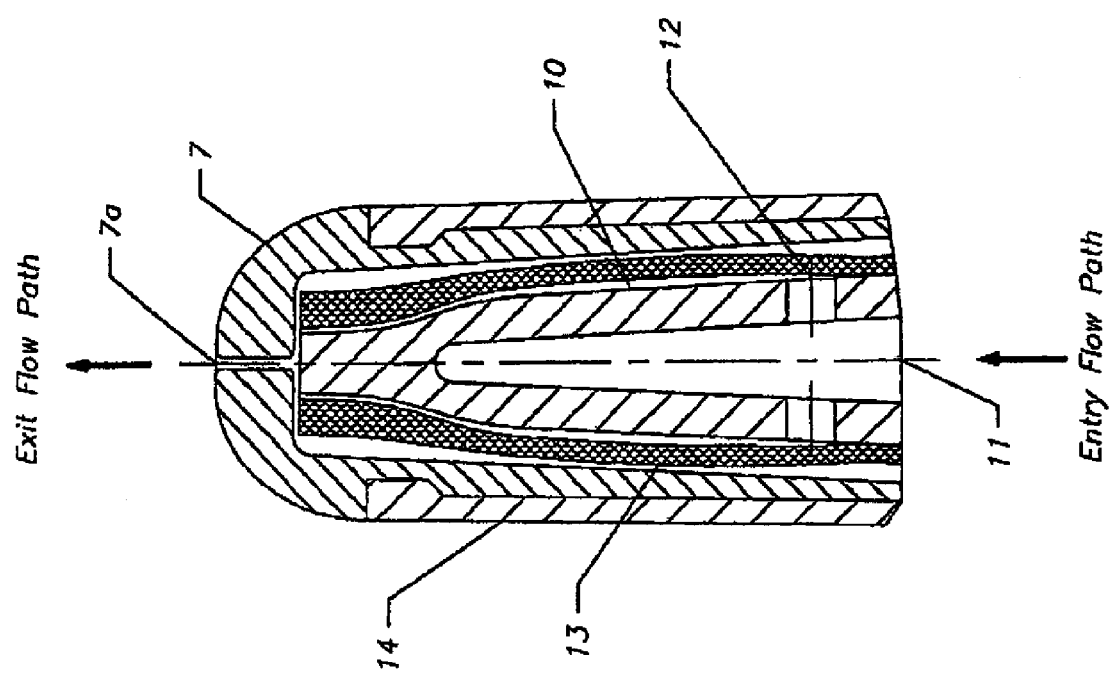
FIG. 4 is an enlarged partial axially extending view of the dispensing end of the one way valve assembly shown in FIG. 3b.

An axially extending valve cover 14 encircles the flexible membrane 13 and as shown in the rest position in FIG. 2a is spaced radially outwardly from the outer surface of the flexible membrane. The end of the valve cover 14 adjacent the container 2 has a radially outwardly extending flange 14a bearing against the flange at the end of the flexible membrane effecting the seal for the valve body at the opening from the container 2.

The valve cover 14 is formed of an inner layer of an elastomeric material extending axially from its flange 14a to and over the outlet end of the valve body 3. The elastomeric material forms a soft cover 7 over the outlet end of the increased thickness which is particularly advantageous when the valve assembly is used for dispensing an eye care solution. Such a soft cover 7 prevents any damage to the eye.

The soft cover 7 has an outlet orifice 7a for dispensing the flowable substance. The outlet orifice is closed in the rest position of the one way valve assembly, however, when the flowable substance is being dispensed and exits the outlet end of the flexible membrane, it flows radially inward to the outlet orifice which then opens allowing the substance to flow out of the valve assembly. When the flowable substance is dispensed and pressure on the source is withdrawn the outlet orifice 7a closes blocking any backflow into the valve assembly.

By selectively dimensioning the outlet orifice 7a a drop-like amount of the flowable substance can be dispensed, for example if an eye care solution is being dispensed. If a greater amount of the flowable substance is to be dispensed the outlet orifice 7a can be formed for dispensing a larger quantity of the flowable substance. The outer orifice 7a can be formed to provide a spray or a stream of the flowable substance.

An over cap 15 is placed over the valve assembly when it is not in use protecting it from contact with ambient contaminants and for unintended dispensing.

When the flowable substance is to be dispensed, the over cap 15 is removed and pressure is applied to the actuator 2a of the container so that an amount of the flowable substance passes out of the container into the passageway 11 in the inner core 10. The substance flows through the ports at least one port 12 and expands the flexible membrane 13 radially outwardly and flows toward the outlet end of the flexible membrane where it exits from the flexible membrane radially inwardly into the outlet orifice 7a in the cover and is dispensed.

By releasing the pressure on the actuator 2a of the container, the dispensing operation is terminated and the flexible membrane 13 returns inwardly into contact with the outer surface of the inner core 10. The inward movement of the flexible membrane start at its outlet end because of its increased thickness and affords gradual contact with the outer surface of the inner core returning any flowable substance through the ports back into the container whereby contaminants cannot enter the container.

Dispensing individual portions of the flowable substance can be continued until the container is almost completely emptied.

As mentioned, a variety of pharmaceuticals, cosmetics, food stuffs and other flowable materials can be dispensed where it is important to maintain them free of contaminants from the ambient atmosphere. The flowable characteristics of the material being dispensed determines the type and dimension of the valve body.

The material forming the outlet orifice 7a does not absorb the flowable substance, any substance entering the outlet orifice is ejected and does not return into the space between the inner core and the flexible membrane.

The invention claimed is:

1. A one way valve assembly for dispensing a flowable substance comprising:
   a source for the flowable substance having an opening,
   a valve assembly connected to the opening for receiving the flowable substance from said source and for dispensing the flowable substance, said valve assembly comprising:
   an axially extending inner core,
   an axially extending flexible membrane tightly fitted over an outer surface of said inner core,
   said inner core having an axially extending passageway in communication with said source, at least one port opening from said passageway to an inner surface of said flexible membrane for expanding said membrane outwardly from said outer surface of said inner core,
   an axially extending cover enclosing an outer surface of said membrane, said cover having an outlet orifice at an end of said inner core spaced axially from said inlet opening for dispensing the flowable substance from the valve body assembly when pressure is applied to the source for flow from the source into the passageway in said inner core and out of said at least one port for expanding said membrane and for flow of the substance between said outer surface of said core and said inner surface of said membrane into said outlet orifice in said cover and when the pressure on said source is released said membrane moves back into tightly fitting contact with the outer surface of said inner core and returns any flowable substance between said membrane and inner core back into said source while preventing any contamination of the flowable substance remaining in the container, wherein said flexible membrane has a variable wall thickness that is greater at the axial end of said membrane adjacent the outlet in said cover.

2. A one way valve assembly, as set forth in claim 1, wherein said membrane has an axially extending uninterrupted continuous band at the axial end of said membrane adjacent the outlet in said cover completely encircling said core.

3. A one way valve assembly, as set forth in claim 1, wherein said membrane has a radially outwardly extending flange at an end thereof adjacent the inlet opening of said inner core, and said cover having a radially outwardly extending flange pressing said flange on said membrane into fluid tight contact with a radially outwardly extending flange at the inlet opening into said inner core.

4. A one way valve assembly, as set forth in claim 1, wherein said outlet orifice from said inner core being in direct flow with the axial end of said membrane adjacent said cover and said outlet orifice in said cover arranged to dispense a selected quantity of the flowable substance.

5. A one way valve assembly, as set forth in claim 4, wherein said outlet orifice in said cover being formed of a soft flexible material.

6. A one way valve assembly, as set forth in claim 1, wherein said valve cover being formed of an inner axially extending flexible member laterally enclosed by an axially extending rigid plastic shell.

7. A one way valve assembly, as set forth in claim 6, wherein said plastic shell having a radially outwardly extending flange bearing against a radially outwardly extending flange on said flexible member of said valve cover adjacent said inlet opening to said inner core.

8. A one way valve assembly, as set forth in claim 7, wherein means are arranged for pressing said flanges on said plastic shell and said flexible member of said valve cover against said flange on said flexible member for effecting the fluid tight contact with said flexible membrane.

9. A one way valve assembly, as set forth in claim 8, wherein said means comprises a collar or connector member for securing said valve body to said closed source.

10. A one way valve assembly, as set forth in claim 1, wherein an overcap is arranged to fit over and form a seal with said valve assembly to prevent external contamination of said valve body during storage and to protect against unintended dispensing of the flowable substance.

11. A one way valve assembly, as set forth in claim 1, wherein at least two said ports extend from said passageway to the inner surface of said flexible membrane, and said passageway extending from said ports toward and spaced axially from an end of said inner core with said passageway forming a blind path beyond said ports spaced from said container. A one way valve assembly, as set forth in claim 1, where in at least two said ports extend from said passageway to the inner surface of said flexible membrane, and said passageway extending from said ports toward and spaced axially forming end of said inner core with said passageway forming a blind path beyond said ports spaced from said container.

12. A one way valve assembly, as set forth in claim 1, wherein said closed source comprises a collapsible reservoir reducible in volume in proportion as the flowable substance is pressed out of said reservoir.

13. A one way valve assembly, so set forth in claim 12, wherein said collapsible reservoir is one of a bellows, a tube and an internal bag.

14. A one way valve assembly, as set forth in claim 13, wherein an axially extending housing laterally encloses said collapsible reservoir.

15. A one way valve assembly, as set forth in claim 14, wherein said housing has a slot extending in the axial direction for applying dispensing pressure to an actuator of said collapsible reservoir.

16. A one way valve assembly, as set forth in claim 4, wherein said cover has a normally closed outlet orifice which opens for dispensing the flowable substance from said cover when dispensing pressure is applied to the collapsible reservoir.

17. A one way valve assembly, as set forth in claim 16, wherein said outlet orifice in said cover is impervious to the flowable substance and does not retain the flowable substance inwardly of the outlet orifice.

* * * * *